United States Patent Office 2,873,293
Patented Feb. 10, 1959

2,873,293
BIS(α-CHLORO-ISOBUTYRATES) OF DIHYDROXY-BENZENES

Donald G. Kundiger, Manhattan, Kans., and Elwin B. W. Ovist, Park Forest, Ill., assignors to The Dow Chemical Company, Midland, Mich., a corporation of Delaware No Drawing. Application August 6, 1956
Serial No. 602,414

3 Claims. (Cl. 260—479)

This invention is directed to bis(α-chloro-isobutyrates) of dihydroxy-benzenes and to a method for their preparation, and is particularly concerned with compounds having the formula

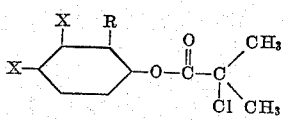

wherein R is hydrogen or a methyl radical, one X is an α-chloro-isobutyryloxy radical and the other X represents chlorine.

The novel ester compounds are crystalline solids or oily liquids somewhat soluble in many organic solvents and of low solubility in water. They have been found useful as intermediates for the preparation of active antimicrobial agents as disclosed in our copending application, Serial No. 602,413, filed concurrently herewith.

In one method of preparing the new compounds, a dihydroxy-benzene compound of the formula

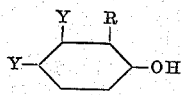

wherein R has the aforementioned significance, one Y represents a hydroxyl radical and the other Y represents chlorine, is reacted with α-chloro-isobutyryl chloride in the presence of an alkali metal hydroxide. In such operation, it is convenient to employ at least 2 moles of the α-chloro-isobutyryl chloride and 2 moles of alkali metal hydroxide to each mole of the dihydroxybenzene reactant. In carrying out the reaction, the dihydroxy-benzene and α-chloro-isobutyryl chloride are mixed together and the alkali metal hydroxide, in the form of an aqueous solution, added thereto portionwise while maintaining the reaction mixture at a temperature of from about 0° to 20° C. On completion of the reaction, the desired bis(α-chloro-isobutyrate) product is isolated by conventional procedures such as solvent extraction, fractional distillation and recrystallization.

In a preferred method for the preparation of the compounds of the invention, a dihydroxy-benzene compound as set forth above and α-chloro-isobutyryl chloride are dissolved in an inert reaction solvent and a tertiary amine is added thereto portionwise while maintaining the reaction mixture at a temperature of from about 0° to 30° C. When operating in accordance with this preferred method, good yields have been obtained when employing at least 2 molar proportions of the α-chloro-isobutyryl chloride and at least 2 molar proportions of tertiary amine for each molar proportion of dihydroxy-benzene in the reaction. On completion of the reaction, the desired bis(α-chloro-isobutyrate) product is recovered by conventional procedures such as washing with water, extraction with solvents and fractional distillation or recrystallization.

Suitable tertiary amines to be employed include pyridine, quinoline, lutidine, picoline, triethylamine, dimethyl aniline and the like.

Suitable reaction solvents to be employed in the above-described preferred method of preparation are solvents capable of forming homogeneous solutions of the dihydroxy-benzene and chloroisobutyryl chloride reactants when mixed and substantially inert to the action of said reactants and of tertiary amines. Such solvents include dialkyl ethers containing from 4 to about 8 carbon atoms, dioxanes, glycol and polyglycol dialkyl ethers and the like. The solvents are preferably freed of water before use to avoid the formation of undesired by-products.

The following examples illustrate the invention but are not to be construed as limiting the same.

Example 1

14.4 grams (0.1 mole) of 2-chloro-hydroquinone and 28.2 grams (0.2 mole) of α-chloro-isobutyryl chloride were dissolved in 100 milliliters of dry diethyl ether and 15.8 grams (0.2 mole) of pyridine added thereto portionwise with stirring. During the above addition, the reaction mixture was maintained at a temperature of about 10° C. Following the addition of the pyridine, stirring of the reaction mixture was continued for a period of 15 minutes and thereafter 150 milliliters of water was added to the crude reaction product forming an aqueous layer and an immiscible organic layer. The organic layer was separated and distilled to remove ether and to obtain the crude product as a residue. The latter was recrystallized from petroleum ether to obtain a 2-chloro-hydroquinone bis(α-chloro-isobutyrate) as a crystalline solid melting at 63°–65° C.

Example 2

74 grams (0.5 mole) of 4-chloro-resorcinol and 155 grams (1.1 mole) of α-chloro-isobutyryl chloride were dissolved in 400 milliliters of dry ether and 87 grams (1.1 moles) of pyridine added thereto portionwise with stirring. The reaction was carried out as in Example 1 during a period of 1.25 hours. Thereafter, the reaction mixture was poured into cold, dilute, aqueous hydrochloric acid solution and the ether layer separated and washed with aqueous 10 percent sodium hydroxide solution and water. Thereafter, the ether layer was fractionally distilled to recover the solvent and to obtain a 4-chloro-resorcinol bis(α-chloro-isobutyrate) product as an oily liquid boiling at 148°–152° C. under 0.25 millimeters pressure and having a refractive index (n/D) of 1.511 at 20° C.

We claim:
1. Bis(α-chloro-isobutyrates) of dihydroxy-benzenes having the formula

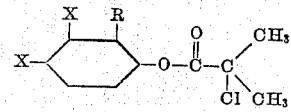

wherein one X represents an α-chloro-isobutyryloxy radical, the other X represents chlorine and R is selected from the group consisting of hydrogen and methyl.
2. 4-chloro-resorcinol bis(α-chloro-isobutyrate).
3. 2-chloro-hydroquinone bis(α-chloro-isobutyrate).

References Cited in the file of this patent

Berichte: Vol. 40, page 2796 (1907).
Beilstein: Vol. 6, 4th ed., pp. 817, 843 (1944).
Groggins: Unit Processes in Organic Synthesis, 4th ed., 623–4 (1952).